(12) United States Patent
Yoo et al.

(10) Patent No.: US 10,687,163 B1
(45) Date of Patent: Jun. 16, 2020

(54) METHOD AND APPARATUS FOR PROCESSING AUDIO SIGNAL USING COMPOSITED ORDER AMBISONICS

(71) Applicant: Electronics and Telecommunications Research Institute, Daejeon (KR)

(72) Inventors: Jae-hyoun Yoo, Daejeon (KR); Yong Ju Lee, Daejeon (KR); Tae Jin Lee, Daejeon (KR); Dae Young Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/539,091

(22) Filed: Aug. 13, 2019

(30) Foreign Application Priority Data

Dec. 17, 2018 (KR) .......................... 10-2018-0163511

(51) Int. Cl.
*H04S 7/00* (2006.01)
*H04R 5/04* (2006.01)
*G02B 27/01* (2006.01)
*G06T 19/00* (2011.01)

(52) U.S. Cl.
CPC .............. *H04S 7/30* (2013.01); *G02B 27/017* (2013.01); *G06T 19/006* (2013.01); *H04R 5/04* (2013.01); *H04S 2420/11* (2013.01)

(58) Field of Classification Search
CPC ..... H04S 7/30; H04S 2420/11; G02B 27/017; G06T 19/006; H04R 5/04
See application file for complete search history.

(56) References Cited

U.S. PATENT DOCUMENTS

| | | |
|---|---|---|
| 2009/0136048 A1 | 5/2009 | Yoo et al. |
| 2012/0269349 A1 | 10/2012 | Seo et al. |
| 2013/0216070 A1 | 8/2013 | Keiler et al. |
| 2013/0325476 A1 | 12/2013 | Yoo et al. |
| 2014/0219456 A1 | 8/2014 | Morrell et al. |
| 2019/0239015 A1* | 8/2019 | Schevciw ............ G02B 27/017 |

FOREIGN PATENT DOCUMENTS

WO      WO 2016/004277 A1      1/2016

* cited by examiner

*Primary Examiner* — Andrew L Sniezek
(74) *Attorney, Agent, or Firm* — NSIP Law

(57) ABSTRACT

Disclosed is an audio signal processing method including identifying a sound source provided inside a preset reference distance and a sound source provided outside the reference distance to represent a sound field based on virtual reality (VR) content that is represented in a predetermined virtual space in which a user is located in a VR environment, processing a sound field using three-dimensional (3D) ambisonics based on height information and horizontal information of the sound source provided inside the reference distance, and processing a sound field using two-dimensional (2D) ambisonics based on horizontal information of the sound source provided outside the reference distance.

19 Claims, 7 Drawing Sheets

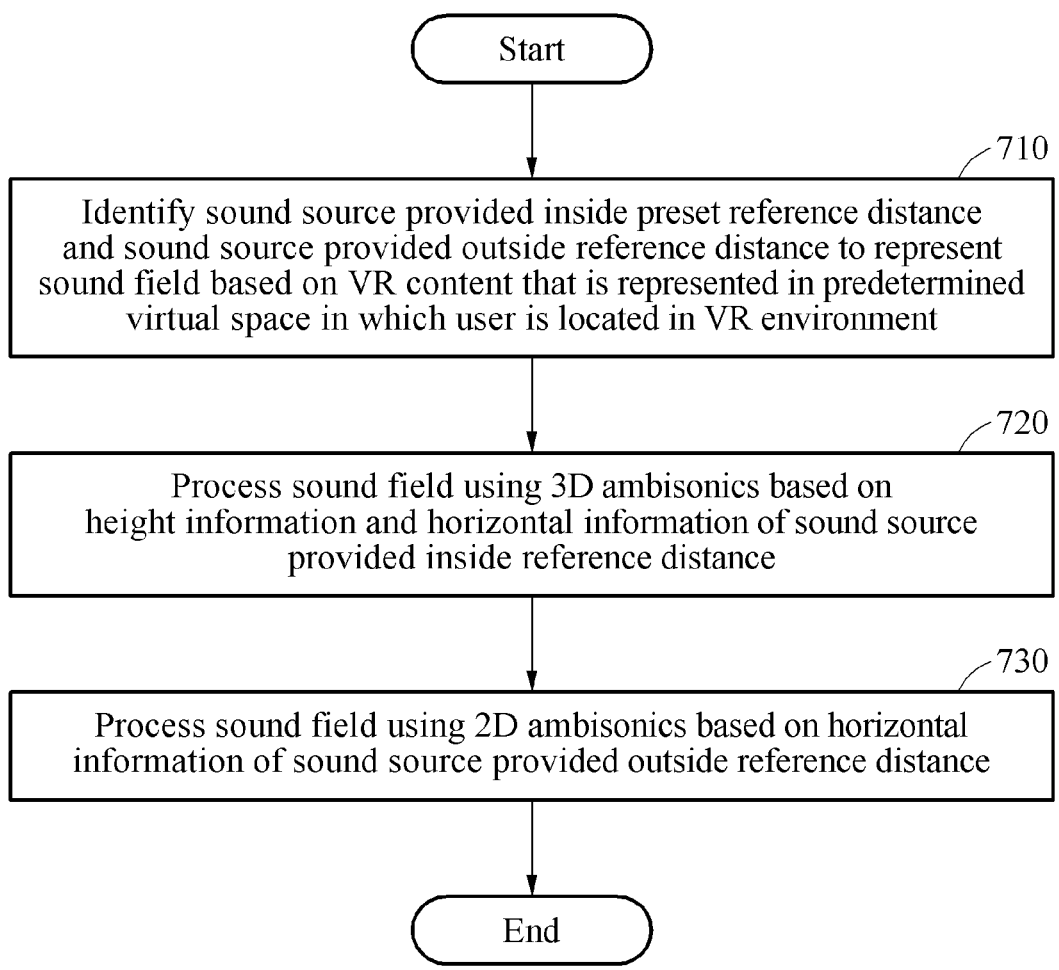

METHOD AND APPARATUS FOR PROCESSING AUDIO SIGNAL USING COMPOSITED ORDER AMBISONICS

CROSS-REFERENCE TO RELATED APPLICATION(S)

This application claims the priority benefit of Korean Patent Application No. 10-2018-0163511 filed on Dec. 17, 2018, in the Korean Intellectual Property Office, the disclosure of which is incorporated herein by reference for all purposes.

BACKGROUND

1. Field

One or more example embodiments relate to technology for providing an effective listening area through an audio signal processing using composited order ambisonics (COA).

2. Description of Related Art

An audio playback environment is developing as a sound system such as mono, stereo, 5.1 channel, 10.2 channel, and 22.2 channel. In addition, a content playback environment is also developing from a television or a movie theater to a virtual reality (VR) environment using a head-mounted display and a smartphone.

When a user performs various interactions in a six degrees of freedom (6DoF) VR environment while freely moving in a virtual space, an audio rendering scheme appropriate for provided VR content is required. Accordingly, there is a desire for technology for providing an effective listening area, for example, a sweet spot to a user while maintaining a small amount of operations when providing an audio suitable for VR content reflecting the interaction.

SUMMARY

An aspect provides technology for processing a sound field suitable for virtual reality (VR) content provided to a user by using ambisonics having a small amount of operations in a VR environment in which a position of the user freely changes.

According to an aspect, there is provided a method of processing an audio signal, the method including identifying a sound source provided inside a preset reference distance and a sound source provided outside the reference distance to represent a sound field based on virtual reality (VR) content that is represented in a predetermined virtual space in which a user is located in a VR environment, processing a sound field using three-dimensional (3D) ambisonics based on height information and horizontal information of the sound source provided inside the reference distance, and processing a sound field using two-dimensional (2D) ambisonics based on horizontal information of the sound source provided outside the reference distance.

The method may further include representing a sound field suitable for the VR content that is represented to the user located in the virtual space by combining the sound field processed using the 3D ambisonics and the sound field processed using the 2D ambisonics.

The reference distance may be set based on a human listening characteristic that is more sensitive to horizontal information than height information.

The 3D ambisonics may correspond to a scheme for processing a sound field using directional component information expressed by spherical harmonics including an order n and a degree m.

2D ambisonics of which an order n is zero to $N_{2D}$ may be used in a case of a distance being greater than the reference distance and 3D ambisonics of which an order n is $N_{2D}+1$ to $N_{3D}$ may be used in a case of a distance being less than or equal to the reference distance.

A degree m being equal to $\pm n$ may be used in a case of a distance being greater than the reference distance, and a degree m ranging between $-(n-1)$ and $(n-1)$ and not being equal to $\pm n$ may be used in a case of a distance being less than or equal to the reference distance.

The 3D ambisonics may include a Fourier coefficient $A_{nm}(k)$, $b_n(k)$ which is a radial function corresponding to a spherical Bessel function $j_n(kr)$ or a Hankel function $h_n(kr)$, $\Gamma_{nm}$ which is a normalization constant, $P^m{}_n(x)$ which is an associated Legendre function, and $e^{imp}$ which is azimuthal harmonics.

The Fourier coefficient $A_{nm}(k)$ may be determined using a plane wave acquired from a free field, and $b_n(k)$ may reflect scattering due to a microphone and a sound source incidence of a free field.

The spherical Bessel function $j_n(kr)$ or the Hankel function $h_n(kr)$ used as the radial function $b_n(k)$ may have a magnitude at a short distance from the user located in the virtual space greater than a magnitude at a long distance from the user.

According to another aspect, there is also provided an apparatus for processing an audio signal, the apparatus including a processor and a memory including an instruction to be read in a computer, wherein when the instruction is executed in the processor, the processor is configured to identify a sound source provided inside a preset reference distance and a sound source provided outside the reference distance to represent a sound field based on VR content that is represented in a predetermined virtual space in which a user is located in a VR environment, process a sound field using 3D ambisonics based on height information and horizontal information of the sound source provided inside the reference distance, and process a sound field using 2D ambisonics based on horizontal information of the sound source provided outside the reference distance.

The processor may be configured to represent a sound field suitable for the VR content that is represented to the user located in the virtual space by combining the sound field processed using the 3D ambisonics and the sound field processed using the 2D ambisonics.

The reference distance may be set based on a human listening characteristic that is more sensitive to horizontal information than height information.

The 3D ambisonics may correspond to a scheme for processing a sound field using directional component information expressed by spherical harmonics including an order n and a degree m.

2D ambisonics of which an order n is zero to $N_{2D}$ may be used in a case of a distance being greater than the reference distance, and 3D ambisonics of which an order n is $N_{2D}+1$ to $N_{3D}$ may be used in a case of a distance being less than or equal to the reference distance.

A degree m being equal to $\pm n$ may be used in a case of a distance being greater than the reference distance, and a degree m ranging between $-(n-1)$ and $(n-1)$ and not equal to $\pm n$ may be used in a case of a distance being less than or equal to the reference distance.

The 3D ambisonics may include a Fourier coefficient $A_{nm}(k)$, $b_n(k)$ which is a radial function corresponding to a spherical Bessel function $j_n(kr)$ or a Hankel function $h_n(kr)$, $\Gamma_{nm}$ which is a normalization constant, $P^m_n(x)$ which is an associated Legendre function, and $e^{imp}$ which is azimuthal harmonics.

The Fourier coefficient $A_{nm}(k)$ may be determined using a plane wave acquired from a free field, and $b_n(k)$ may reflect scattering due to a microphone and a sound source incidence of a free field.

The spherical Bessel function $j_n(kr)$ or the Hankel function $h_n(kr)$ used as the radial function $b_n(k)$ may have a magnitude at a short distance from the user located in the virtual space greater than a magnitude at a long distance from the user.

According to example embodiments, it is possible to provide a method of processing an audio signal using composited order ambisonics (COA), the method which processes a sound field suitable for VR content provided to a user using ambisonics having a small amount of operations in a VR environment in which a location of the user freely changes.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 7 is a diagram illustrating an audio signal processing method performed by an audio signal processing apparatus according to an example embodiment.

DETAILED DESCRIPTION

Figure 1:
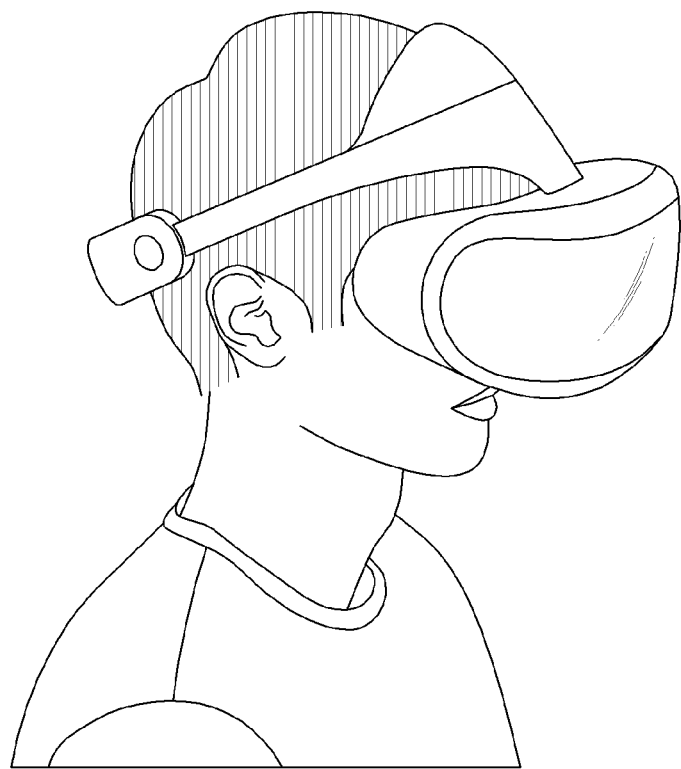
FIG. 1 is a diagram illustrating an example of providing virtual reality (VR) content to a user in a virtual space using a head-mounted display (HMD) according to an example embodiment.

Detailed example embodiments of the inventive concepts are disclosed herein. However, specific structural and functional details disclosed herein are merely representative for purposes of describing example embodiments of the inventive concepts. Like numbers refer to like elements throughout the description of the figures.

It should be understood, however, that there is no intent to limit this disclosure to the particular example embodiments disclosed. On the contrary, example embodiments are to cover all modifications, equivalents, and alternatives falling within the scope of the example embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Hereinafter, some example embodiments will be described in detail with reference to the accompanying drawings.

FIG. 1 is a diagram illustrating an example of providing virtual reality (VR) content to a user in a virtual space using a head-mounted display (HMD) according to an example embodiment.

VR content may be provided to a user wearing an HMD in a virtual space. The user may perform various interactions while moving in a predetermined virtual space, and the VR content may be provided to the user in response to the interaction.

Here, when providing the VR content, various audio signal processing methods may be applied. For example, ambisonics which is a scene-based rendering scheme may be used to represent a sound field based on a scene of the provided VR content.

The ambisonics may be an audio signal processing scheme that processes a sound field using directional component information expressed as a spherical harmonics function. In other words, the ambisonics may be an audio signal processing scheme that processes a sound field by recognizing a sound field as a sum of basic functions and verifying a contribution of each of the basic function for representing the sound field. Thus, the ambisonics may use a three-dimensional (3D) spherical harmonics function to express the sound field.

When an order of the ambisonics increases, an amount of data to be processed may also increases, so that a large amount of operations may be required to provide the VR content reflecting the interaction in real time. Therefore, there is a desire for a method of representing the sound field using ambisonics having a small amount of operations in a VR environment in which a location of the user freely changes.

Figure 2:
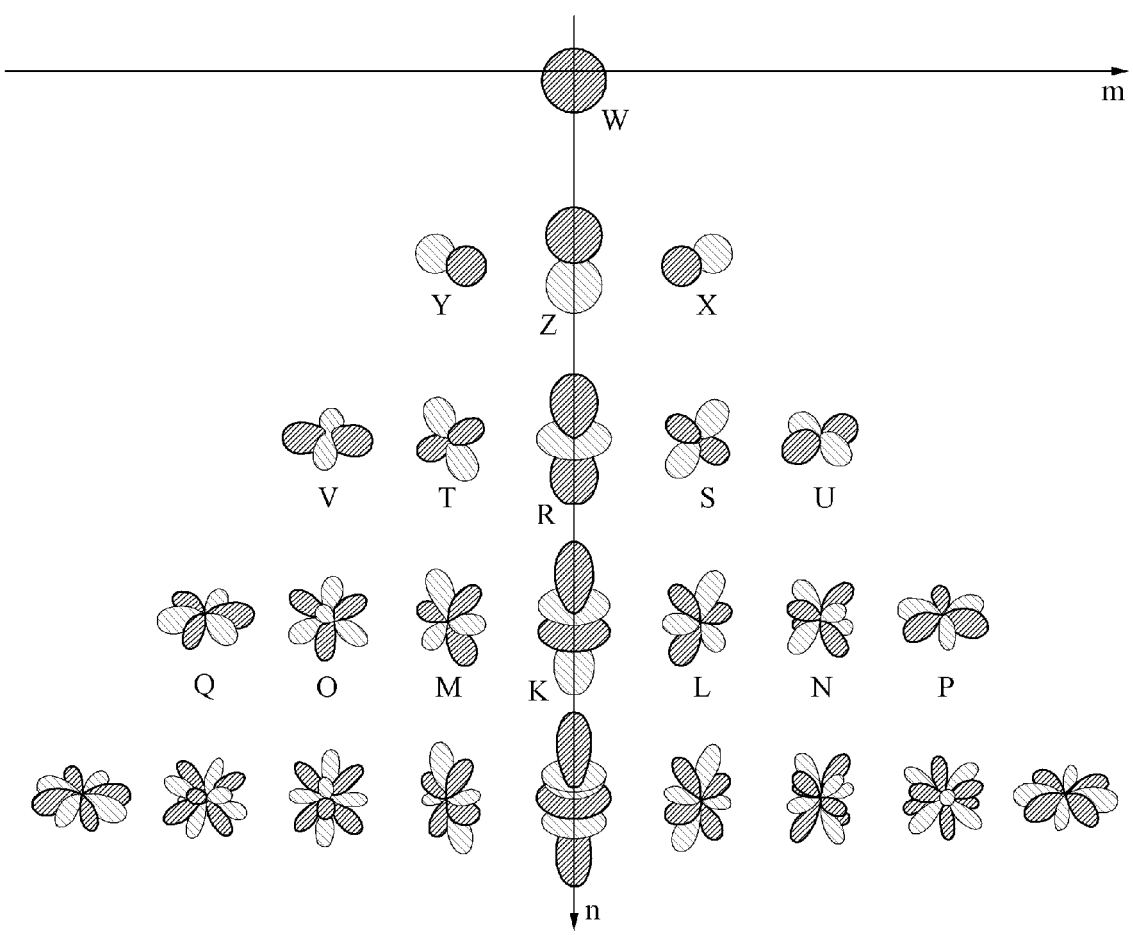
FIG. 2 is a diagram illustrating a case in which n is equal to 4 according to an example embodiment.

FIG. 2 is a diagram illustrating a case in which n is equal to 4 according to an example embodiment.

Ambisonics may be an audio signal processing scheme that processes a sound field using directional component information expressed as a spherical harmonics function. An ambisonics signal may be expressed as shown in Equation 1. In Equation 1, $\Gamma_{nm}$ may be expressed as shown in Equation 2.

$$p(r, \theta, \phi, \omega) = \sum_{n=0}^{\infty} \sum_{m=-n}^{n} A_{nm}(k) b_n(k) \Gamma_{nm} P_n^m(\cos\theta) e^{im\phi} \quad \text{[Equation 1]}$$

$$\Gamma_{nm} = \sqrt{\frac{2n+1}{4\pi} \frac{(n-m)!}{(n+m)!}} \quad \text{[Equation 2]}$$

In Equations 1 and 2, n and m denote an order and a degree, respectively, $A_{nm}(k)$ is a Fourier coefficient, $b_n(k)$ denotes a spherical Bessel function, $j_n(kr)$ or a Hankel function $h_n(kr)$ as a radial function, $\Gamma_{nm}$ is a normalization constant, $P_n^m(x)$ denotes an associated Legendre function, and $e^{im\phi}$ denotes azimuthal harmonics. $\Gamma_{nm} P_n^m(\cos x) e^{im\phi}$ denotes spherical harmonics.

As shown in Equation 1, when the ambisonics is used to represent an accurate sound field corresponding to VR content, information associated with n being equal to 0 to an infinite order.

Here, spherical harmonics for each order n may have $2n+1$ types, and $(N+1)^2$ channels may exist up to a predetermined order N. In one example, when n=1, four channels W, X, Y, and Z may exist, which represents a number of channels by $(1+1)^2$. In this example, since $0^2*0+1$ channels exist in a $0^{th}$ order and $2*1+1$ channels exist in a first order, a total of four channels may exist. In another example, if n=10, an operation may be performed on $121 (=(10+1)^2$, that is, $(2*0+1)+(2*1+1)+(2*2+1)+ \ldots +(2*10+1))$ channels to represent an accurate sound field.

Figure 3:
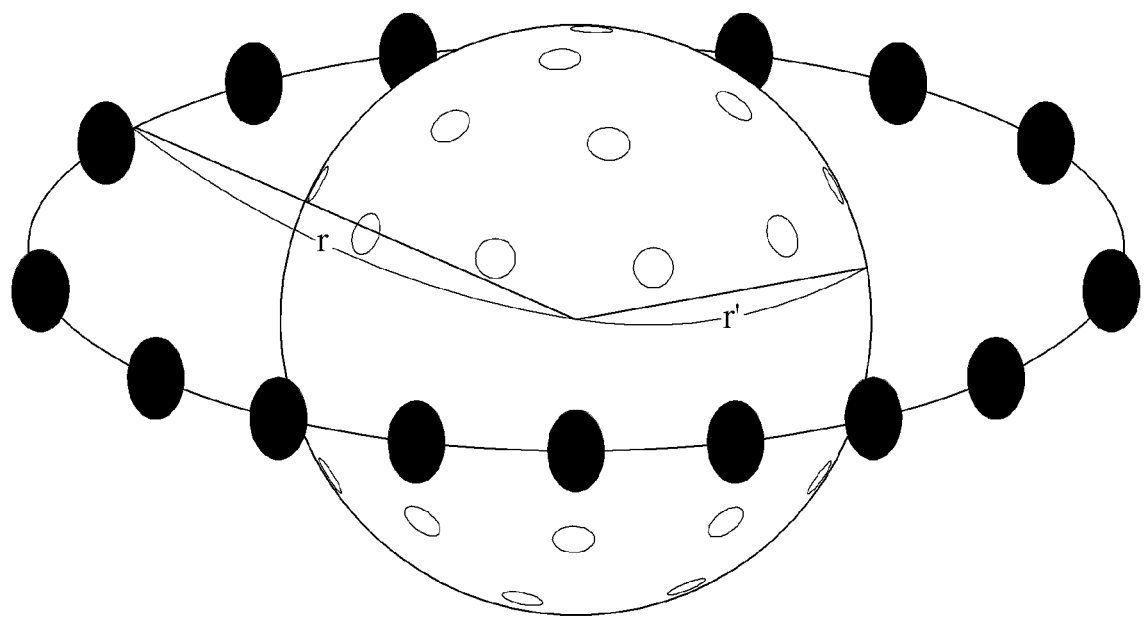
FIG. 3 is a diagram illustrating a relative sound field processing performed with respect to a distance r and a distance r' according to an example embodiment.

FIG. 3 is a diagram illustrating a relative sound field processing performed with respect to a distance r and a distance according to an example embodiment.

When an order increases, an amount of data to be processed may also increase. Thus, when considering a human listening characteristic, fewer operations may be performed through an approximation. A sound source may include height information and horizontal information. The human listening characteristic may be more sensitive to the horizontal information than the height information. In consideration of the human listening characteristic, a sound field may be represented for a sound source at a long distance using only the horizontal information irrespective of the height information, and a sound field may be represented for a sound source at a short distance from a user using the height information in addition to the horizontal information.

To process the sound field at the long distance using two-dimensional (2D) information and process the sound field at the short distance using 3D information, a microphone disposed on a plane to acquire a 2D sound field may be located farther from a 3D microphone. For example, when a recording space is a quadrangular space, the 2D sound field may be acquired by disposing a 3D microphone at a center of the recording space and disposing a horizontal-plane microphone at each edge (of four corners).

In an example, the 2D microphone and the 3D microphone may be disposed on a surface of a spherical microphone irrespective of a distance. In this example, a relatively small number of 2D microphones may be arranged on a horizontal plane at large intervals and a relatively large number of 3D microphones may be arranged at small intervals in all spaces except the horizontal plane. Through this, the 3D information more precise than the 2D information may be acquired.

As such, an audio rendering scheme that determines whether to use height information of a sound source based on a distance from a user may be referred to as composited order ambisonics (COA), which may be expressed as shown in Equation 3.

$$p'(r, \theta, \phi, \omega) = \sum_{n=0}^{N_{2D}} A_{nn_\pm}(k) b_n(k) \Gamma_{nn_\pm} P_n^{n_\pm}(\cos\theta) e^{in_\pm\phi} + \quad \text{[Equation 3]}$$

$$\sum_{n'=N_{2D}+1}^{N_{3D}} \sum_{m=-(n-1)}^{n-1} A_{n'm}(k_{r'}) b_{n'}(k_{r'}) \Gamma_{n'm} P_{n'}^m(\cos\theta) e^{im\phi}$$

In terms of an entire area corresponding to a distance r, 2D ambisonics having an order n of 0 to $N_{2D}$ may be used to process a sound field. Also, to represent a sound source to represent a sound field of a distance r', 3D ambisonics having height information corresponding to an order n' of $N_{2D}+1$ to $N_{3D}$ may be used to process the sound field. Here, r denotes a long distance from a user and r' denotes a short distance from the user. r and r' may be different distances or the same distance depending on an example.

Equation 3 includes an expression of a case in which a degree m is equal to $\pm n$ and an expression of a case in which a degree m is $-(n-1)$ to $(n-1)$ and is not $\pm n$. Equation 3 may also be expressed using Equation 4 as below.

$$p'(r, \theta, \phi, \omega) = \sum_{n=0}^{N_{2D}} A_{nn_\pm}(k) \quad \text{[Equation 4]}$$

$$\left( j_n(kr) - \frac{j'_n(kr)}{h_n^{'(1)}(kr)} h_n^{(1)}(kr) \right) \Gamma_{nn_\pm} P_n^{n_\pm}(\cos\theta) e^{in_\pm\phi} +$$

$$\sum_{n'=N_{2D}+1}^{N_{3D}} \sum_{m=-(n-1)}^{n-1} A_{n'm}(k) \left( j_{n'}(kr') - \frac{j'_{n'}(kr')}{h_{n'}^{'(1)}(kr')} h_{n'}^{(1)}(kr') \right)$$

$$\Gamma_{n'm} P_{n'}^m(\cos\theta) e^{im\phi}$$

In Equation 4, $A_{nm}(k) = 4\pi i^n Y_n^m(\theta_k, \phi_k)^*$ which may be determined based on a plane wave acquired in a free field, a spherical Bessel function $j_n(kr)$ corresponds to a radial function in the free field, and a Hankel function $h_n(kr)$ corresponds to a radial function representing a case in which scattering occurs as in a rigid environment. For example, $b_n(kr)$ reflecting scattering due to a microphone and a sound source incidence of the free field may be applied.

Figure 4:
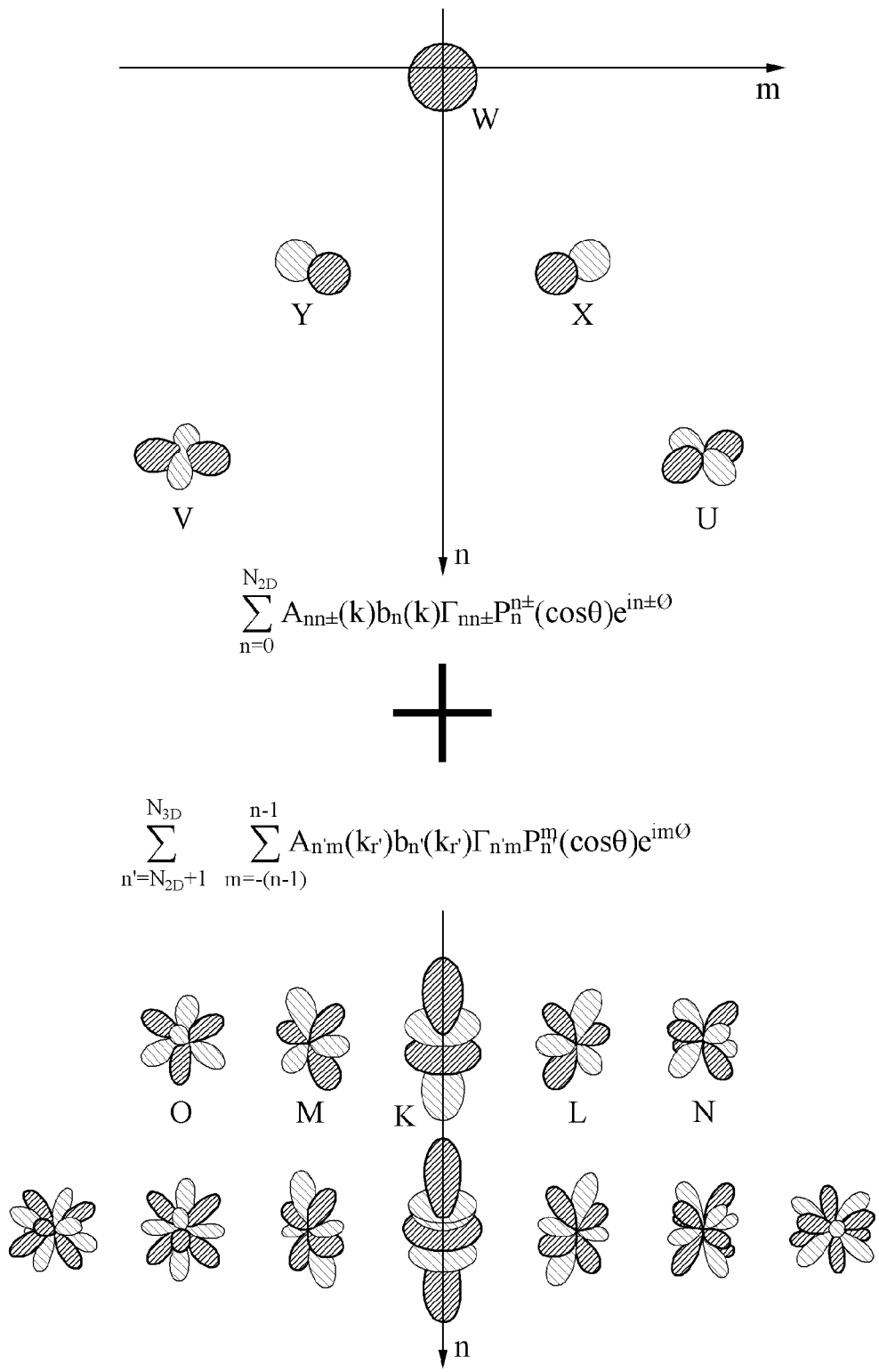
FIG. 4 is a diagram illustrating a relationship of a case in which $N_{2D}$ is equal to 2 and a case in which $N_{3D}$ is equal to 4 according to an example embodiment.
Figure 5:
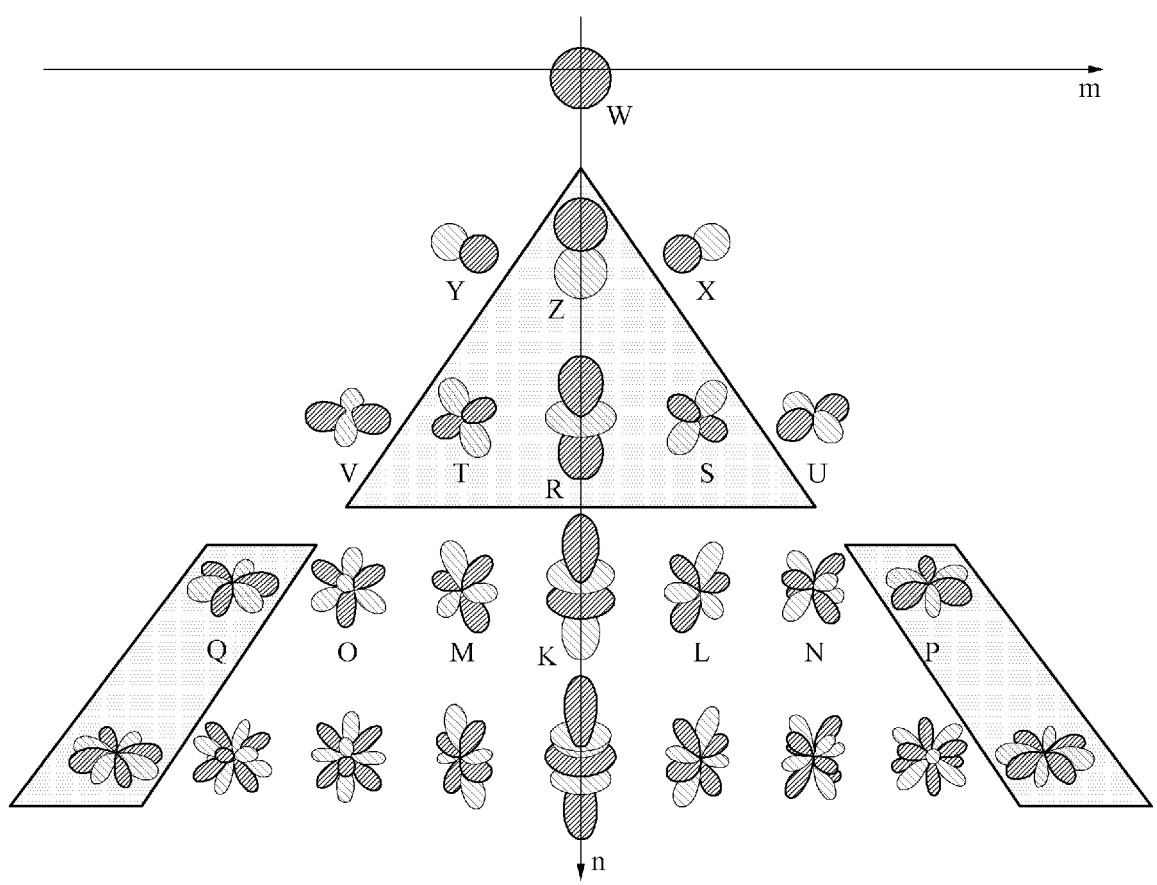
FIG. 5 is a diagram illustrating a used or unused component used according to an example embodiment.

FIG. 4 is a diagram illustrating a relationship of a case in which $N_{2D}$ is equal to 2 and a case in which $N_{3D}$ is equal to 4 according to an example embodiment. FIG. 5 is a diagram illustrating a used or unused component used according to an example embodiment. When n is a further higher order, and when COA is used, unused components may increase.

For example, a system using ambisonics may use $N_{2D}$, $N_{3D}$, and COA flag as parameters shown in Table 1 by transmitting or receiving $N_{2D}$, $N_{3D}$, and COA flag as metadata.

TABLE 1

| parameter | | value |
| --- | --- | --- |
| Type | HOA | 0 |
| | COA | 1 |
| | reserved . . . | 2 |
| N for HOA | | 5 |
| $N_2D$ for COA | | 2 |
| $N_3D$ for COA | | 4 |

Figure 6A:
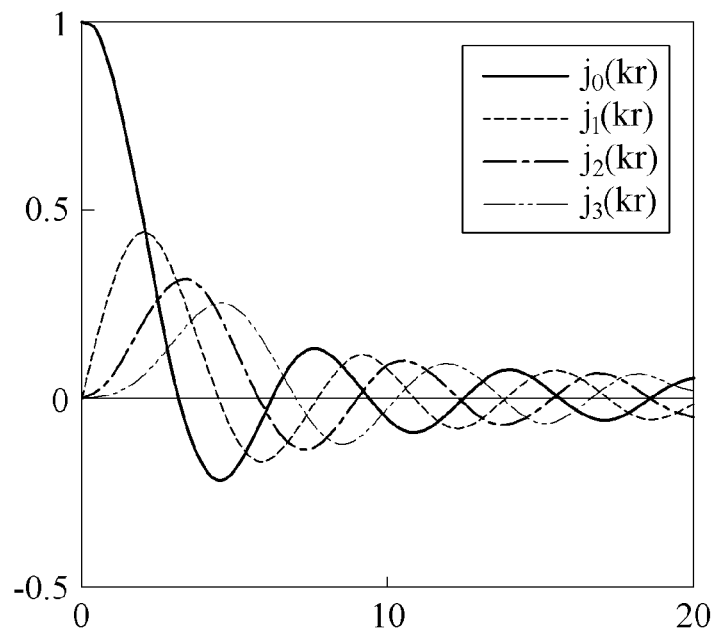
FIGS. 6A and 6B are diagrams illustrating an example in which a magnitude of a spherical Bessel function $j_n(kr)$ or a Hankel function $h_n(kr)$ used as a radial function changes based on a distance from a user according to an example embodiment.
Figure 6B:
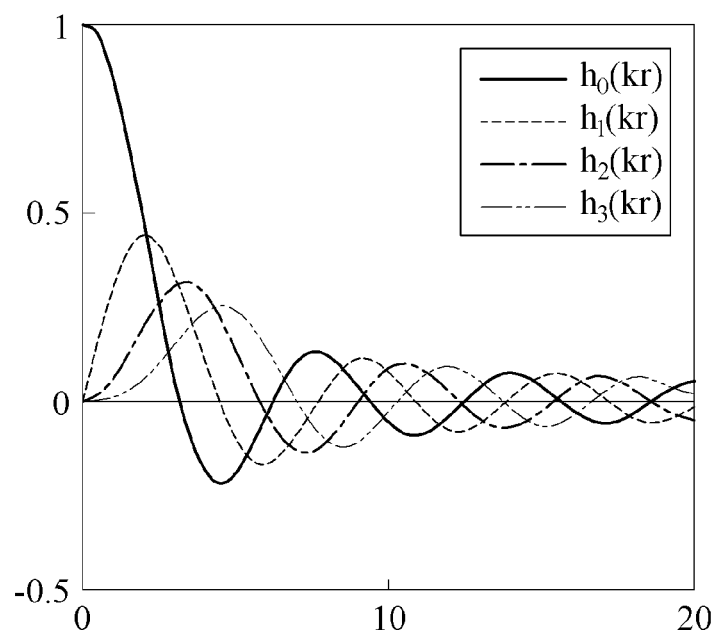

FIGS. 6A and 6B are diagrams illustrating an example in which a magnitude of a spherical Bessel function $j_n(kr)$ or a Hankel function $h_n(kr)$ used as a radial function changes based on a distance from a user according to an example embodiment. As illustrated in FIGS. 6A and 6B, a spherical Bessel function $j_n(kr)$ or a Hankel function $h_n(kr)$ may indicate that an influence is large in sound field representation at a short distance from a user and the influence is small in sound field representation at a long distance from the user. Thus, in a case of a location far from the user, an amount of operations may be reduced by using only a lower order component. The spherical Bessel function is shown in Equation 5 and the Hankel function is shown in Equation 6.

$$j_n(x) = (-1)^n x^n \left( \frac{1}{x} \frac{d}{dx} \right)^n \frac{\sin(x)}{x} \quad [\text{Equation 5}]$$

$$h_n^{(1)}(x) = -i(-1)^n x^n \left( \frac{1}{x} \frac{d}{dx} \right)^n \frac{e^{ix}}{x} \quad [\text{Equation 6}]$$

According to an example embodiment, in a VR environment in which VR content is replayed, it is possible to represent a sound field suitable for the VR content with a small amount of operations through a sound field processing using 3D ambisonics and a sound field processing using 2D ambisonics of a limited order based on a distance from a user, without need to use an infinite order of ambisonics.

FIG. 7 is a diagram illustrating an audio signal processing method performed by an audio signal processing apparatus according to an example embodiment.

In operation 710, the audio signal processing apparatus may identify a sound source provided inside a preset reference distance and a sound source provided outside the reference distance to represent a sound field based on VR content that is represented in a predetermined virtual space in which a user is located in a VR environment. The reference distance may be set based on a human listening characteristic that is more sensitive to horizontal information than height information.

In operation 720, the audio signal processing apparatus may express a sound field using 3D ambisonics based on height information and horizontal information of the sound source provided inside the reference distance.

In operation 730, the audio signal processing apparatus may express a sound field using 2D ambisonics based on horizontal information of the sound source provided outside the reference distance. The audio signal processing apparatus may represent a sound field suitable for the VR content that is represented to the user located in the virtual space by combining the sound field processed using the 3D ambisonics and the sound field processed using the 2D ambisonics.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of processing an audio signal, the method comprising:
    identifying a sound source provided inside a preset reference distance and a sound source provided outside the reference distance to represent a sound field based on virtual reality (VR) content that is represented in a predetermined virtual space in which a user is located in a VR environment;
    processing a sound field using three-dimensional (3D) ambisonics based on height information and horizontal information of the sound source provided inside the reference distance; and
    processing a sound field using two-dimensional (2D) ambisonics based on horizontal information of the sound source provided outside the reference distance.

2. The method of claim 1, further comprising:
    representing a sound field suitable for the VR content that is represented to the user located in the virtual space by combining the sound field processed using the 3D ambisonics and the sound field processed using the 2D ambisonics.

3. The method of claim 1, wherein the reference distance is set based on a human listening characteristic that is more sensitive to horizontal information than height information.

4. The method of claim 1, wherein the 3D ambisonics corresponds to a scheme for processing a sound field using directional component information expressed by spherical harmonics including an order n and a degree m.

5. The method of claim 1, wherein 2D ambisonics of which an order n is zero to $N_{2D}$ is used in a case of a distance being greater than the reference distance, and 3D ambisonics of which an order n is $N_{2D}+1$ to $N_{3D}$ is used in a case of a distance being less than or equal to the reference distance.

6. The method of claim 5, wherein a degree m being equal to ±n is used in a case of a distance being greater than the reference distance, and a degree m ranging between −(n−1) and (n−1) and not being equal to ±n is used in a case of a distance being less than or equal to the reference distance.

7. The method of claim 1, wherein the 3D ambisonics includes a Fourier coefficient $A_{nm}(k)$, $b_n(k)$ which is a radial function corresponding to a spherical Bessel function $j_n(kr)$ or a Hankel function $h_n(kr)$, $\Gamma_{nm}$ which is a normalization constant, $P^m{}_n(x)$ which is an associated Legendre function, and $e^{im\varphi}$ which is azimuthal harmonics.

8. The method of claim 7, wherein the Fourier coefficient $A_{nm}(k)$ is determined using a plane wave acquired from a free field, and $b_n(k)$ reflects scattering due to a microphone and a sound source incidence of a free field.

9. The method of claim 7, wherein the spherical Bessel function $j_n(kr)$ or the Hankel function $h_n(kr)$ used as the radial function $b_n(k)$ has a magnitude at a short distance from the user located in the virtual space greater than a magnitude at a long distance from the user.

10. A non-transitory computer-readable storage medium storing instructions that, when executed by a processor, cause the processor to perform the method of claim 1.

11. An apparatus for processing an audio signal, the apparatus comprising:
    a processor; and
    a memory comprising an instruction to be read in a computer,
    wherein when the instruction is executed in the processor, the processor is configured to identify a sound source provided inside a preset reference distance and a sound source provided outside the reference distance to represent a sound field based on virtual reality (VR) content that is represented in a predetermined virtual space in which a user is located in a VR environment,
    process a sound field using three-dimensional (3D) ambisonics based on height information and horizontal information of the sound source provided inside the reference distance, and
    process a sound field using two-dimensional (2D) ambisonics based on horizontal information of the sound source provided outside the reference distance.

12. The apparatus of claim 11, wherein the processor is configured to represent a sound field suitable for the VR content that is represented to the user located in the virtual space by combining the sound field processed using the 3D ambisonics and the sound field processed using the 2D ambisonics.

13. The apparatus of claim 11, wherein the reference distance is set based on a human listening characteristic that is more sensitive to horizontal information than height information.

14. The apparatus of claim 11, wherein the 3D ambisonics corresponds to a scheme for processing a sound field using directional component information expressed by spherical harmonics including an order n and a degree m.

15. The apparatus of claim 11, wherein 2D ambisonics of which an order n is zero to $N_{2D}$ is used in a case of a distance being greater than the reference distance, and 3D ambisonics of which an order n is $N_{2D}+1$ to $N_{3D}$ is used in a case of a distance being less than or equal to the reference distance.

16. The apparatus of claim 15, wherein a degree m being equal to ±n is used in a case of a distance being greater than the reference distance, and a degree m ranging between −(n−1) and (n−1) and not equal to ±n is used in a case of a distance being less than or equal to the reference distance.

17. The apparatus of claim 11, wherein the 3D ambisonics includes a Fourier coefficient $A_{nm}(k)$, $b_n(k)$ which is a radial function corresponding to a spherical Bessel function $j_n(kr)$ or a Hankel function $h_n(kr)$, $\Gamma_{nm}$ which is a normalization constant, $P^m{}_n(x)$ which is an associated Legendre function, and $e^{im\varphi}$ which is azimuthal harmonics.

18. The apparatus of claim 17, wherein the Fourier coefficient $A_{nm}(k)$ is determined using a plane wave acquired from a free field, and $b_n(k)$ reflects scattering due to a microphone and a sound source incidence of a free field.

19. The apparatus of claim 17, wherein the spherical Bessel function $j_n(kr)$ or the Hankel function $h_n(kr)$ used as the radial function $b_n(k)$ has a magnitude at a short distance from the user located in the virtual space greater than a magnitude at a long distance from the user.

* * * * *